Sept. 1, 1953  F. H. MUELLER ET AL  2,650,620
PIPE LINE STOPPER
Filed Dec. 13, 1948

Inventors:
Frank H. Mueller, &
John J. Smith,
By Cushman, Darby & Cushman
ATTORNEYS.

Patented Sept. 1, 1953

2,650,620

UNITED STATES PATENT OFFICE 2,650,620

PIPE LINE STOPPER

Frank H. Mueller and John J. Smith, Decatur, Ill., assignors to Mueller Co., Decatur, Ill., a corporation of Illinois Application December 13, 1948, Serial No. 64,932

2 Claims. (Cl. 138—94)

This invention relates to means for stopping the flow of fluid in a conduit.

In the distribution of fluids in pipe line systems, it frequently becomes necessary to extend, repair or replace some section of the pipe. To accomplish this, it is desirable to stop the flow of fluid through the pipe at a point or points immediately adjacent the section to be worked upon, thereby stopping off and removing from service as small a section as possible.

It is an object of this invention to provide a stopper readily affixed to an existing pipe line to stop the flow of fluid therethrough.

It is a further object of this invention to provide a stopper of simplified construction readily affixed to an existing pipe line at any point therein, to stop the flow of fluid therethrough in an expeditious and economical manner.

A further object is to provide a stopper of simplified construction particularly useful in conjunction with mains of relatively small diameter, carrying fluid at relatively low pressure.

A still further object is to provide a stopper readily incorporated into a pipe without interrupting the supply of fluid therein, by means of which the fluid supply in the pipe may be temporarily shut off, to permit a section of the pipe to be repaired, replaced or extended.

Further objects of the invention will be in part obvious and in part pointed out hereinafter.

The invention and the novel features thereof may best be made clear from the following description and the accompanying drawings, in which.

Figure 1:
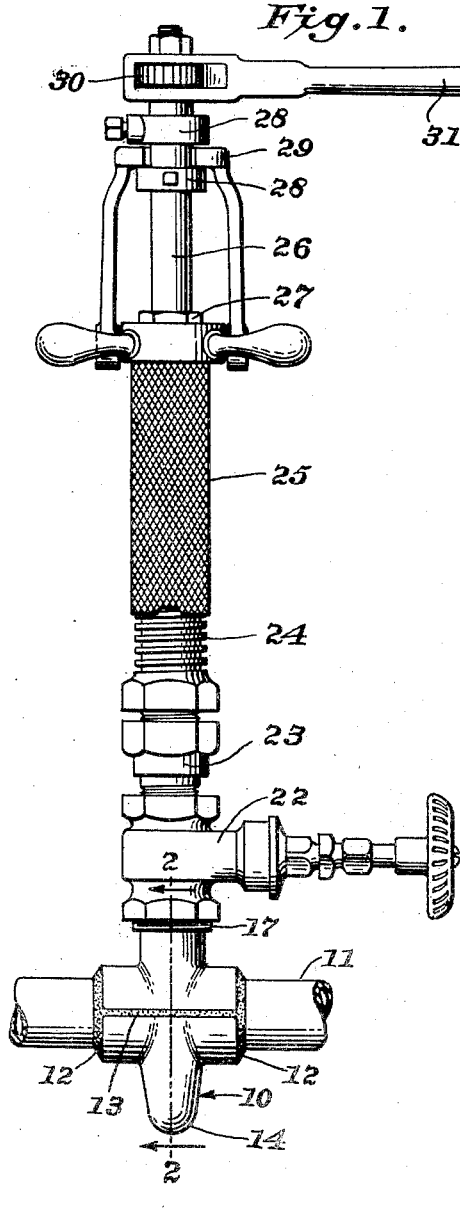
Figure 1 is an elevation of a portion of a gas main with the stopper of this invention affixed thereto in operative relationship.

Referring to the drawings, Figure 1 shows a preferred embodiment of the invention, comprising the tubular fitting 10 enclosing the gas main or pipe 11 and suitably fastened thereon, as by end welds 12. The fitting 10, it will be understood, may be affixed to an existing pipe 11 by severing the fitting transversely, and reuniting the sections thereof in place on the pipe by means of the side welds 13, in the manner well known in the art. It will be apparent that the fitting may be bolted in place, or otherwise suitably secured.

The fitting 10 comprises a closed end 14 and the open end 15, adjacent which are provided the internal thread 16 and the external thread 17. The inner wall of fitting 10 defines the smooth bore 18, extending on either side of pipe 11, from internal thread 16 to the constriction or shoulder 19, beyond which the chip chamber 20 extends to closed end 14. The diameter of bore 18 is preferably appreciably less than the internal diameter of the pipe 11, for reasons presently apparent.

The walls of pipe 11 are provided with the opposed apertures 21, in alignment with bore 18 and of equal diameter. As will be understood by those skilled in the art, the apertures 21 may be drilled without interrupting the flow of fluid through pipe 11 by attaching the gate valve 22 to the external thread 17 of fitting 10, and mounting in said gate valve the usual enclosed drilling machine, comprising the adapter 23, the externally threaded drilling chamber 24, the feed nut 25 threadably engaged on drilling chamber 24, and the boring bar 26 slidably and rotatably mounted in chamber 24, and sealed by the pressure of the gland nut 27. The outer end of boring bar 26 comprises the collars 28, operatively engaged by the yoke 29 extending from feed nut 26, and the ratchet 30, operatively engaged by the operating handle 31. The operation of the drilling machine is well known in the art, and is fully described, for example, in U. S. Patent No. 2,171,577, issued September 5, 1939, to Larry and Cline.

In drilling the apertures 21, it has been found that if the drill diameter is equal to, or larger than, the internal diameter of the pipe 11, the inside walls of the pipe 11 are unavoidably cut away, making a fluid-tight seal more difficult to attain. It is an essential feature of this invention, therefore, that the diameter of the drilled apertures 21 and the corresponding diameter of the bore 18 be slightly less than and preferably appreciably less than the internal diameter of the pipe 11. The chip chamber 20, it will be understood, is adapted to receive the drill guide, and to receive and retain a large proportion of the chips resulting from the drilling operation.

After the drilling is completed, the boring bar 26 and the attached drill may be withdrawn and gate valve 22 closed. The stopper unit of this invention is then inserted into the bore 18, conveniently by the drilling machine previously described. The stopper unit comprises the rigid guide 32, the elongated, cylindrical resilient plug 33, constructed of solid rubber or equivalent material, and optionally the rigid cap 34. The guide 32 may be provided with the internal thread 35, for convenient attachment to boring bar 26 or other suitable control member. The drilling machine with the stopper unit attached to the boring bar 26 thereof may again be mounted in gate valve 22, the valve opened, and the stopper unit inserted until cap 34 engages the shoulder 19. The plug 33 may be of the same diameter as bore 18, but is preferably of slightly smaller diameter, so as to be loosely slidable therein.

Figure 2:
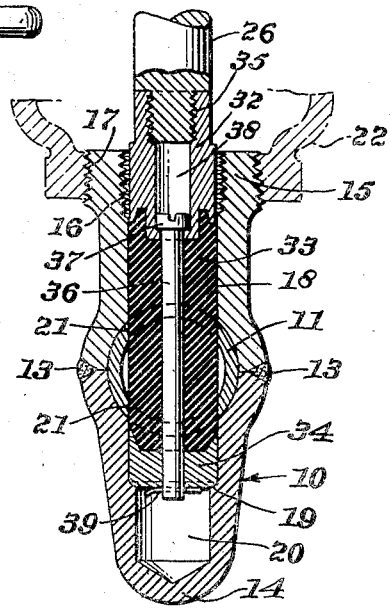
Figure 2 is an enlarged partial transverse section through the main and the stopper, taken on the line 2—2 in Figure 1.

It will be noted that the plug 33 is considerably longer than the external diameter of pipe 11, and extends a considerable distance on either side thereof. With cap 34 abutting shoulder 19, and the plug 33 in relaxed, uncompressed condition, it is desirable that the guide 32 be at least partially within the bore 18, as shown in Figure 2, so that the outer end of plug 33 may be displaced and guided inwardly without binding on the internal thread 16 or any other projection. The flow of fluid through pipe 11 may then be stopped by displacing guide 32 inwardly, forcing the stopper unit against shoulder 19 and compressing plug 33, whereby it is caused to expand radially within pipe 11 to form an effective seal.

Figure 3:
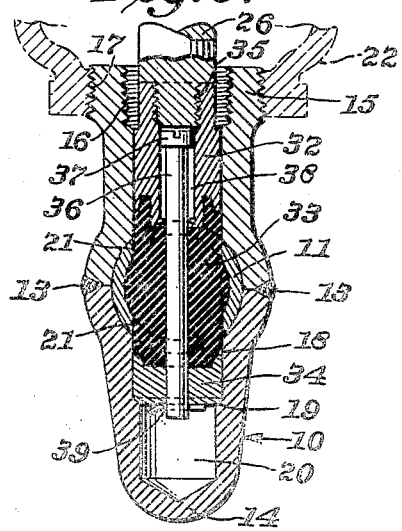
Figure 3 is a section corresponding to Figure 2, with the moveable parts of the stopper in compressed, fluid-stopping relationship with the main.

The construction described has particular utility when used in conjunction with mains of relatively small diameter, for example two inches or less, in which case the length to diameter ratio of the plug 33 is relatively great. The resulting tendency toward instability and buckling of the relatively thin plug is effectively overcome by the bore 18, wherein the ends of the plug are retained and guided, and the plug restrained thereby from lateral, torsional and other undesired displacement. It is an essential feature of the invention that the length of the bore extending from pipe 11 to the internal thread 16 be adequate to effectively retain the end of plug 33 when the plug is in fully compressed position, as shown in Figure 3. The restraining and guiding influence of the bore 18 is aided by displacement of guide 32 in a purely axial direction. It will be noted that the drilling machine previously referred to is well adapted to compress the stopper unit with axial movement, without twisting, and is desirably employed for that purpose. The boring bar 26 together with guide 32 may be moved inwardly by rotation of feed nut 25 and the associated yoke 29, in the direction whereby the innermost of the collars 28 is slidably engaged and displaced by the yoke.

The plug 33 is preferably of solid construction to provide maximum stability and stiffness, and is preferably, though not necessarily, further reinforced and stiffened by the central rod 36. The head 37 of rod 36 is retained within the socket 38, provided therefor in guide 32, and at the other end of rod 36 is provided the cotter pin 39, in retaining relationship with cap 34. The guide 32, plug 33 and cap 34 are slidable on the rod 36, so that the rod will not always assume the same position after compression of the plug 33, but may extend into socket 38 or into the chip chamber 20.

The stopper unit may be retained in sealing relationship as long as desired, and when no longer needed, as when the pipe 11 has been suitably repaired or extended, the stopper unit and the boring bar 26 may be withdrawn through valve 22, the valve closed and the drilling machine removed. If desired, the drilling machine may be employed to thread a plug into engagement with internal thread 16 to seal the fitting 10, whereupon the valve 22 may also be removed.

It will thus be seen, that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:

1. In a pipe stopper the combination comprising: a continuous length of pipe; a tubular fitting attached thereto to extend on opposite sides thereof, one end of said fitting being open and the other end closed and the inner wall thereof between said ends defining a smooth bore on opposite sides of said pipe of smaller diameter than the inside diameter of said pipe, said bore being of substantially greater length than the outside diameter of said pipe and extending on opposite sides thereof, the walls of said pipe having circular openings within said fitting in alignment with and of diameters equal to that of said bore; a constriction in said bore adjacent said fitting closed end and beyond the pipe; a resilient compression-expansible cylindrical plug of a diameter substantially equal to that of said bore insertable therein to be guided thereby, said plug being of a length to be received completely within said bore and to extend from said constriction through said circular pipe openings substantially to the opposite end of said bore; and means for axially compressing said plug against said constriction from the opposite end of said plug to thereby expand the latter into sealing engagement with said pipe.

2. The structure defined in claim 1 in which the plug includes a rigid circular guide member at the end of said plug adjacent the open end of the fitting, said guide member being of the same diameter as the expansible portion of said plug and at least partially within the bore and in guiding relationship therewith when the other end of said plug abuts the constriction and said resilient expansible portion of said plug is in relaxed uncompressed condition.

FRANK H. MUELLER.
JOHN J. SMITH.

References Cited in the file of this patent

UNITED STATES PATENTS

| Number | Name | Date |
|---|---|---|
| 929,589 | Harding | July 27, 1909 |
| 2,108,068 | Larry | Feb. 15, 1938 |
| 2,171,937 | Larry et al. | Sept. 5, 1939 |
| 2,285,392 | Cline | June 9, 1942 |

FOREIGN PATENTS

| Number | Country | Date |
|---|---|---|
| 362,953 | Great Britain | of 1941 |